United States Patent [19]

Esner

[11] 4,004,115
[45] Jan. 18, 1977

[54] BUCKLES FOR VEHICLE SAFETY BELTS AND HARNESSES

[75] Inventor: Mark Edward Esner, London, England

[73] Assignee: Howard Wall Limited, London, England

[22] Filed: Sept. 19, 1975

[21] Appl. No.: 614,921

[30] Foreign Application Priority Data

Nov. 13, 1974 United Kingdom ............ 49043/74

[52] U.S. Cl. .................. 200/61.58 B; 24/230 A; 24/230 AL
[51] Int. Cl.² .................. H01H 3/16; A44B 11/26
[58] Field of Search .................. 200/61.58 B, 52 R; 24/230 A, 230 AL

[56] References Cited

UNITED STATES PATENTS

| | | | |
|---|---|---|---|
| 3,756,339 | 9/1973 | Cornelison, Jr. et al. ... | 200/61.58 B X |
| 3,781,497 | 12/1975 | Stephenson et al. ........ | 200/61.58 B |
| 3,833,781 | 9/1974 | Rumpf ........................ | 200/61.58 B |
| 3,890,003 | 6/1975 | Close ......................... | 200/61.58 B X |
| 3,895,196 | 7/1975 | Lewis ......................... | 200/61.58 B |
| 3,955,056 | 5/1976 | Lindblad ..................... | 200/61.58 B |
| 3,956,603 | 5/1976 | Fisher ........................ | 200/61.58 B |

*Primary Examiner*—James R. Scott
*Attorney, Agent, or Firm*—Shoemaker and Mattare, Ltd.

[57] ABSTRACT

A buckle for a safety belt or harness for a vehicle. The buckle comprises a plate having an aperture defined therein and a casing which separably receives the plate through an entrance slot in the casing. A latch mechanism positioned within the casing releasably latches the plate to the casing. A spring mounted in the casing has one end located closely adjacent the entrance slot and is compressed by the plate when that plate is inserted into the casing. The spring urges the plate outwardly and applies outward force thereto in an essentially continuous manner until the plate is nearly completely ejected from the casing.

11 Claims, 8 Drawing Figures

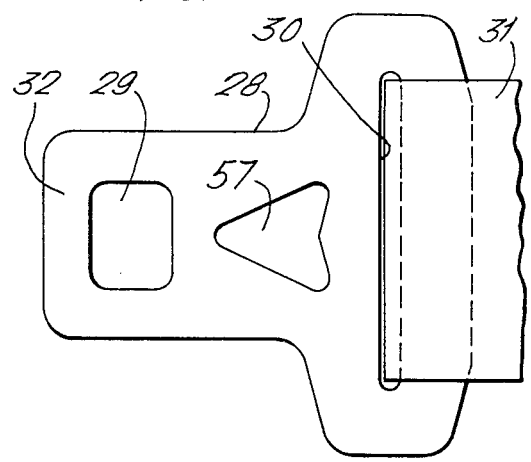
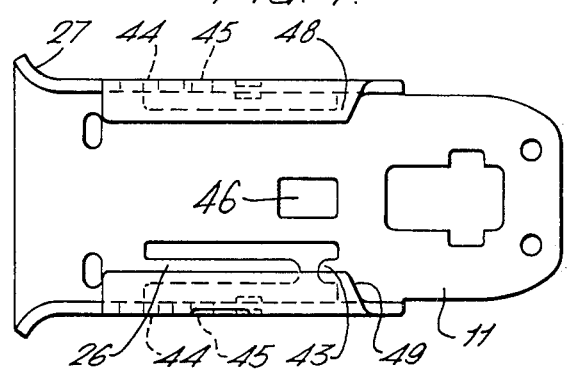
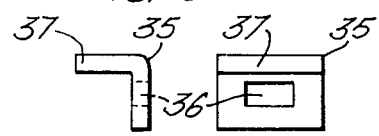

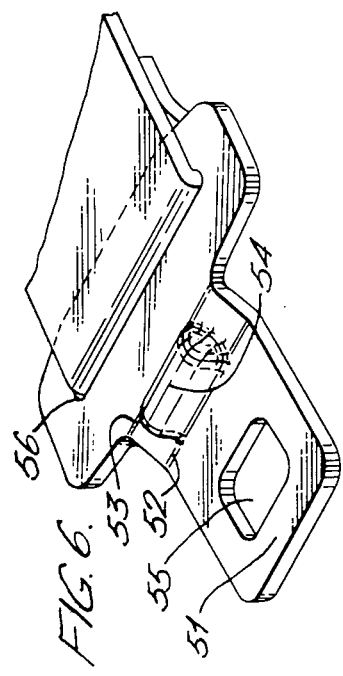
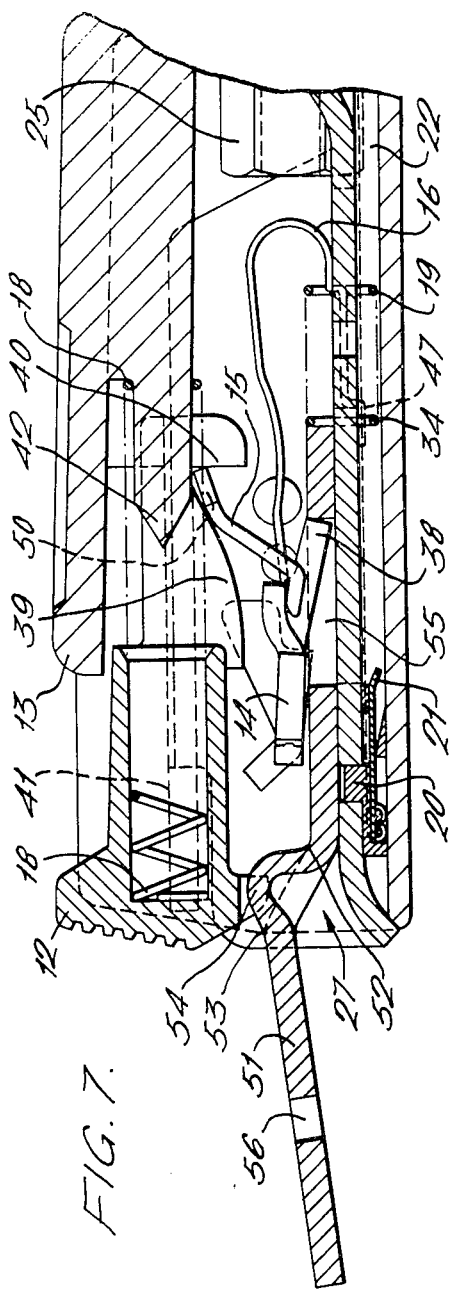

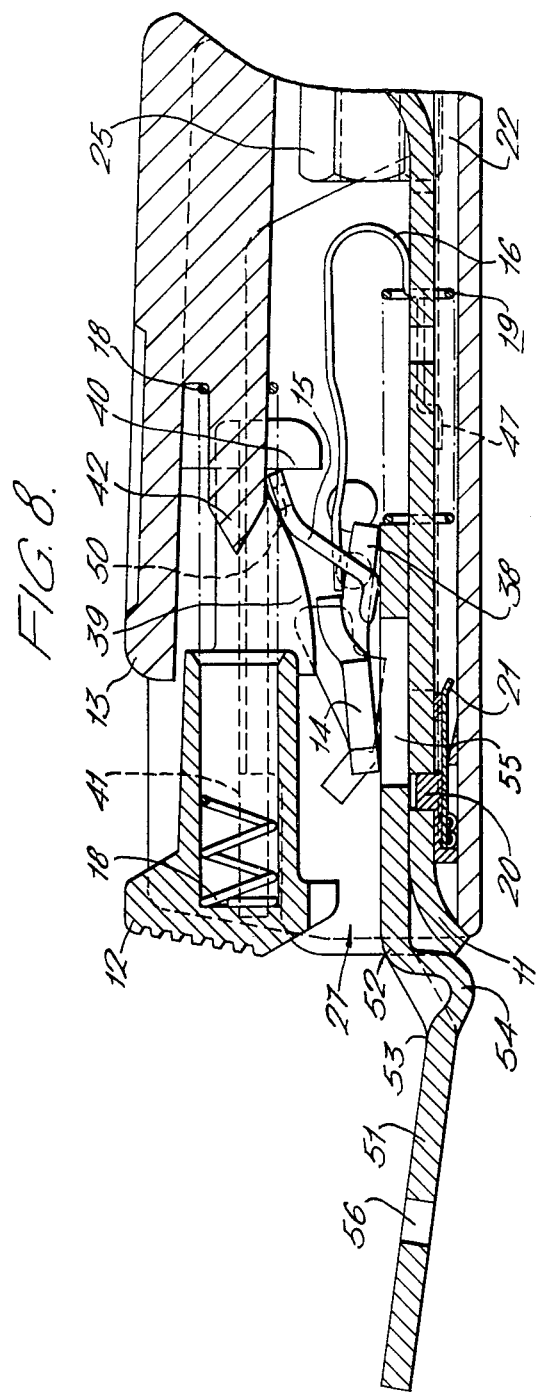

BUCKLES FOR VEHICLE SAFETY BELTS AND HARNESSES

BACKGROUND OF THE INVENTION

This invention relates to buckles for use with safety belts and harnesses such as are used on road vehicles and aircraft and specifically to such buckles of the type having two separable parts held together by co-operating aperture and latch or notch and latch means provided by the two parts, the latch being controlled by a spring pressed element.

The invention consists of a buckle of the type defined in which one part comprises a plate having one or more apertures to which one or more strap end portions can be fitted, and the second part, which includes the latch and spring pressed element, has means by which the second part can be connected to a road vehicle or aircraft, a mouth into which a portion of the plate can be placed, and one or more springs or spring controlled units, which extend to, or almost to, the mouth.

The spring, springs or units can be used to eject the plate from the buckle when the spring pressed element is operated to unlatch the two parts and/or to control means to give an indication and/or to prevent operation of the vehicle or aircraft when the two parts of the buckle are not connected together.

The invention also consists of a buckle of the type defined in which one part comprises a plate having one or more apertures to which one or more strap end portions can be fitted, and the second part, which includes the latch and spring pressed element, has means by which the second part can be connected to a road vehicle or aircraft, a mouth into which part of the plate can be placed, and means for ejecting the plate from the said mouth which means is operative on the plate during the whole or the major part of its journey from its position latched within the second part to the mouth of the said second part.

The invention also consists of a buckle of the type defined in which one part comprises a plate havng one or more apertures to which one or more strap end portions can be fitted, and the second part, which includes the latch and spring pressed element, has means by which the second part can be connected to a road vehicle or aircraft, a mouth into which part of the plate can be placed, and means, including equipment at or near the mouth, which is operated when the end of the said plate is inserted into the said mouth to give an indction and/or to prevent operation of the vehicle or aircraft when the two parts of the buckle are not connected together.

The plate can carry one or more projections to close any gap or gaps that might exist between the plate and the lips of the mouth, and can be cranked so that, when it is in position in the second part, it closes the whole, or the major part of the mouth.

BRIEF DESCRIPTION OF THE DRAWINGS

Embodiments of buckles according to the invention are described hereinafter with reference to the accompanying drawings of which:

FIG. 3 is a plan of the said other part of the buckle.

FIG. 4 shows part of the buckle part shown in FIGS. 1 and 2.

FIG. 5 shows two views of a unit which can be used in the buckle shown in FIGS. 1 and 2.

FIG. 6 shows an alternative form of the part of the buckle shown in FIG. 3 and.

FIGS. 7 and 8 show this alternative second part of FIG. 6 correctly and incorrectly inserted into the buckle part of FIG. 1.

DETAILED DESCRIPTION OF THE PREFERRED EMBODIMENT

Figure 1:
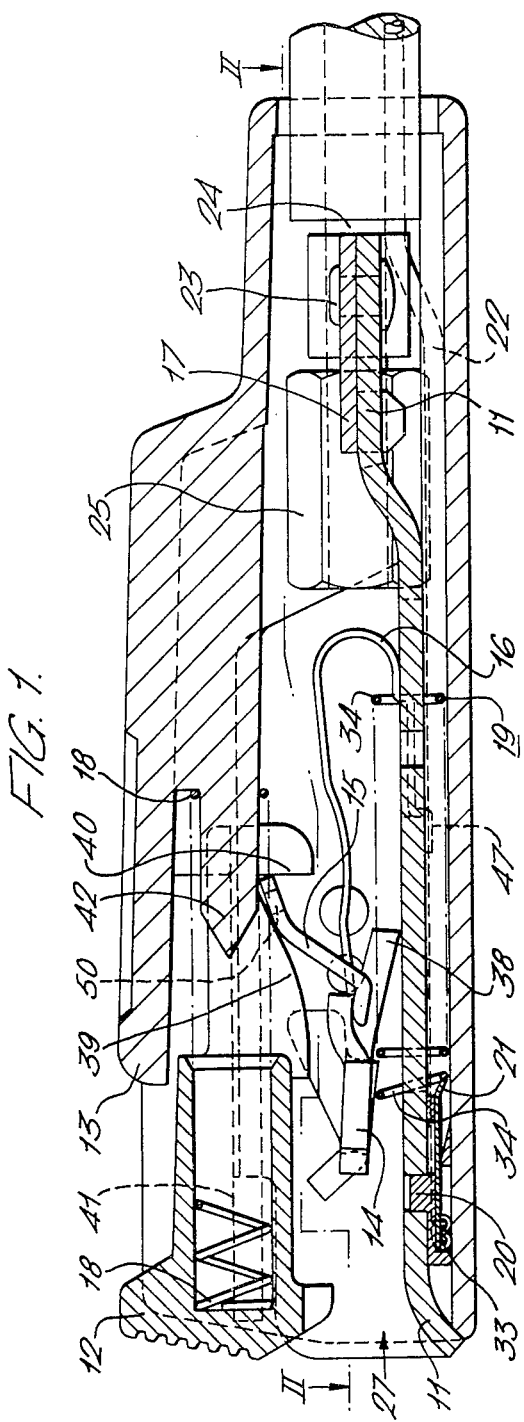
FIG. 1 is a section through one part of the buckle which includes the latch and spring pressed element and the switch in the position to activate auxiliary equipment.

The buckle shown in FIGS. 1 to 4 comprises two parts namely a plate 28 to which a safety strap or harness 31 can be attached and a casing 13 enclosing a channel 11 which carries a slider 12, a lever 15 and a latch 14.

Plate 28 has an aperture 29 which can be engaged by tooth 38 of latch 14 and a slot 30 by means of which a safety belt or harness 31 is connected to the plate by stitching or any other suitable means.

Slider 12 is provided with grooves, not shown, which slide on flanges 48, 49 of channel 11, cam surface 39 which co-operates with lever 15 to release latch 14 when the slider 12 is pressed into the casing, a vertical face 40 which holds the slider in the channel 11, and an aperture 41 to hold the spring 18 which pressed slider 12 into its normal position shown in FIG. 1. The spring 18 is located around a spigot 42 carried by casing 13.

Channel 11 is provided with a mouth 27, flared as shown, aligned apertures 45, 44 in which the pivots of lever 15 and latch 14 are mounted, a slot 46 through which one end 47 of latch spring 16 is passed to hold the latch spring in position within the buckle, a projection 43 and a spigot 26 around which spring 19 is located.

Channel 11 is connected to the cable 24 by swaged-on sleeve 25 and plate 17, the plate 17 being connected to the channel by rivets 23.

Spring 19 can be compressed along spigot 26, one end being held on projection 43 on channel 11 and the other end 34 being engaged by the end 32 of plate 28 when the plate end is inserted into the mouth 27 of the channel 11. The end 34 of the spring 19 moves almost to the mouth of the channel 11 as shown in FIG. 1 and the end of the spring can be extended if desired to reach the mouth of the channel. Alternatively, if it is desired to ensure that the spring acts on the plate 28 until the plate is clear of the mouth 27 of the channel 11, a unit 35, as shown in FIG. 5 can be provided.

Unit 35 has a slot 36 which slides on spigot 26 and a projecting tongue 37 which is of sufficient length to reach the mouth of the channel when the unit 35 is pressed by the spring 19. The tongue 37 can be made of sufficient width to close the opening in the mouth of the buckle if desired.

A switch housing 20, which could be made from any suitable insulating material, for example, nylon, is mounted on the channel 11 near its mouth. The housing carries a contact arm 21, which is in the path of the end 34 of spring 19, the contact arm being connected to the conducting wire of a cable 22, for example by crimping the end 33 of the contact arm 21 to the wire. As shown in the Figures, the housing comprises a block of material to enable the contact arm to flex within a channel defined in that housing to receive the contact arm and a layer of material located above the contact arm to properly position the elements within the channel. The crimped end 33 of the contact arm is also housed in the channel. Cable 22 passes between channel 11 and casing 13 and passes out of the buckle within the casing of cable 24, which is provided to connect the buckle to the floor or other rigid part of the vehicle or aircraft. Cable 24 is preferably a semi rigid cable. Accordingly, the circuit path to ground includes spring 19, channel 11, the rivet 23, the plate 17, and the cable 24 connected to the floor or other rigid part of the vehicle.

Cable 22 is connected to suitable indicating or control means. These could comprise an indicating lamp or buzzer, or means to immobilise the vehicle when the two parts of the buckle are not connected, such as, for example, the ignition circuit could be broken, a plate could cover the keyhole for the ignition key, or the gear lever, steering wheel or some other part of the vehicle could be locked.

To fasten the two parts of the buckle together, the end 32 of the plate 28 is pressed into the mouth 27 of the channel 11. The end 32 of the plate contacts either the end 34 of spring 19, or tongue 37 of unit 35 and the spring 19 is compressed. The end 32 of plate 28 passes under tooth 38 of latch 14 and the tooth 38 drops into the aperture 29 in the plate under the action of spring 16 to hold the plate within the casing. When the end 34 of spring 19 breaks contact with contact arm 21 circuits controlled through cable 22 function to indicate that the plate is within the casing and/or to render inoperative any means provided to immobilise the vehicle. If the plate is not pressed fully into the casing, spring 19 ejects the plate as soon as pressure on the plate is removed.

To release the plate, the slider 12 is pressed into the casing. Cam surface 39 rides along the bridge 50 of lever 15 so that the lever is depressed to lift latch 14 moving tooth 38 out of aperture 29. Spring 19 forces plate 28 from the casing, the spring acting on the plate until the plate is out of, or almost out of, the mouth 27 of the channel 11. The spring end 34, or the unit 35 if provided, makes contact with contact arm 21 to complete the circuit through cable 22 to indicate that the parts of the buckle are separated, and any means provided to prevent operation of the vehicle become operative, to prevent further operation of the vehicle until the parts of the buckle are again united.

Slider 12, when released, is returned to its normal position by spring 18.

In the example described above a gap can exist in the mouth of the buckle between the surface of the plate 28 and the underside of the slider 12 through which extraneous matter, such as, for example, small pieces of glass from a shattered wind screen, could enter the buckle which might clog the mechanism of the buckle and hamper, or prevent, the efficient release of the buckle parts.

Such a gap, or gaps, can be closed by providing one or more suitable projections on the plate 28 in positions to fill the gaps when the plate is locked in the channel 11, for example if a central gap exists where the slider 12 is cut away to avoid the latch 14, the heart shaped aperture 57 of plate 28 as shown in FIG. 3 could be replaced by a projection, which would be made from metal or a plastics material.

If a gap exists across the whole of the mouth this can be closed by suitably cranking the plate, and any additional gaps could be closed by projections. A plate suitably cranked and provided with a central projection is shown in FIGS. 6, 7, and 8.

Figure 2:
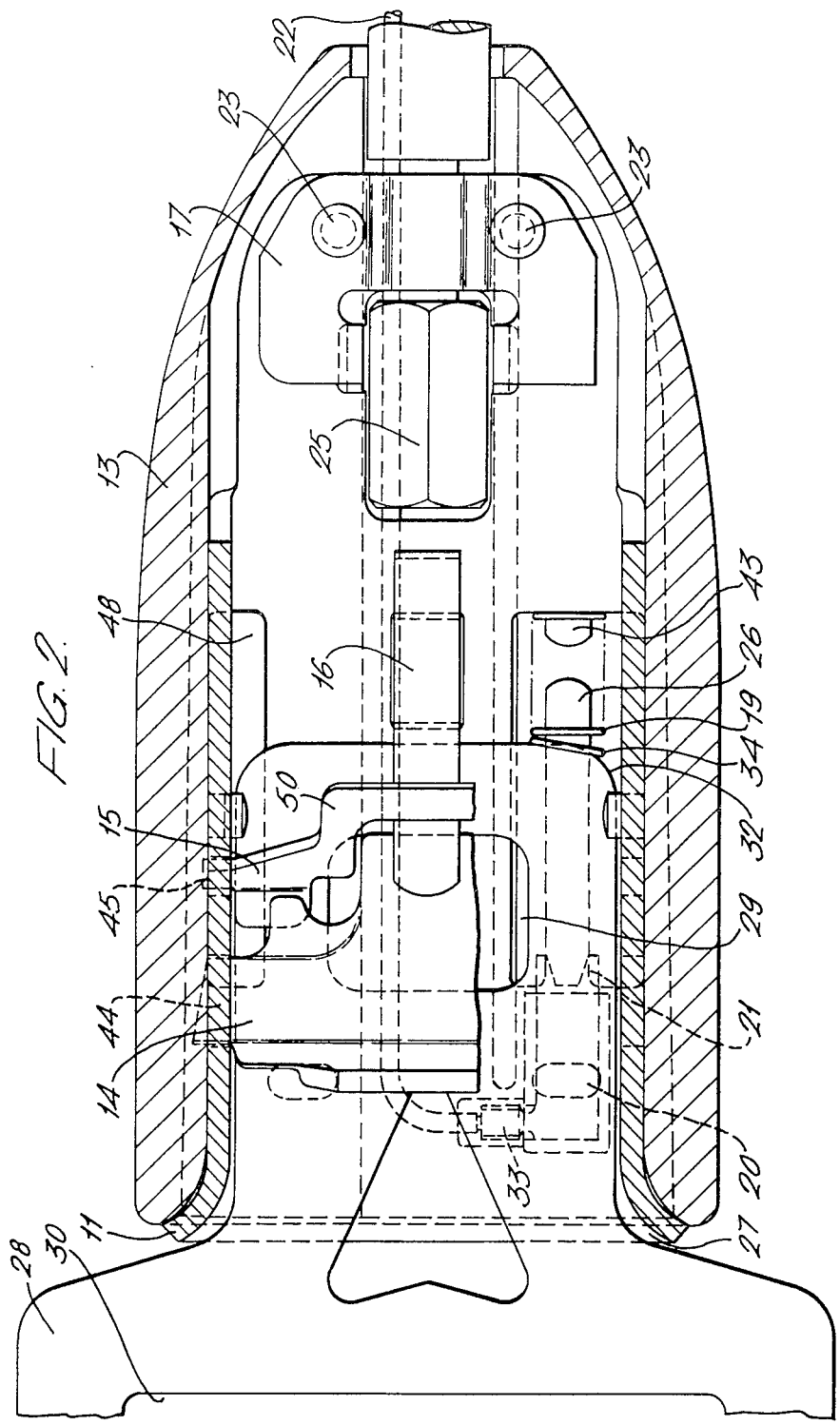
FIG. 2 is a plan on the line II—II of FIG. 1 with part of the latch and lever removed and with the other part of the buckle latched in position and with the switch in the position in which the auxiliary equipment is not activated.

In FIGS. 7 and 8 parts of the buckle are given the same reference numerals as the same parts shown in FIGS. 1 and 2. The plate 28 is however replaced by a plate 51 which has an aperture 55 which can be engaged by tooth 38 of latch 14 and a slot 56 by means of which a safety belt or harness can be connected to the plate. The plate is cranked as shown at 52 and 53 and carries a projection 54 which is of such a size that it almost fills the slot in the underside of the slider 12.

If the plate 51 is inserted into the mouth 27 of channel 11 with the projection 54 towards the slider 12, as shown in FIG. 7, the plate can be slid into the channel 11 so that the tooth 38 of latch 14 drops into the aperture 55 to hold the plate within the channel. The cranked part of the plate fills the mouth of the channel and the gap on the underside of the slider is blocked by projection 54. No extraneous matter can enter the buckle when the parts are connected.

If the plate 51 is inserted into the mouth of the channel 11 with the projection 54 on the side of the plate remote from the slider 12, as shown in FIG. 8, the projection 54 engages the lower lip of the mouth 27 before aperture 55 reaches tooth 38. The tooth cannot drop into the aperture, and as soon as the plate is released it is ejected by spring 19 from the channel.

The plates 28 and 51 are described above as having one aperture 29 or 55. More than one aperture could be provided if desired to co-operate with a similar number of teeth carried by the latch 14, or the plates could be provided with notches or teeth on their sides in addition to or instead of the aperture or apertures referred to above, the notches or teeth being engaged by suitably shaped teeth carried by the latch 14.

The plates 28 and 51 are described as having a single slot 30 or 56 by means of which a safety belt or harness is connected to the plates. More than one slot could be provided, or the slot or slots could be replaced by snubbing buckles so that the effective lengths of the straps of the belt or harness can be adjusted. The straps of the belt or harness remote from the buckle can be connected to fixed or adjustable points on the vehicle or aircraft, or could be connected to suitable retracting means if desired.

The latch and lever need not be pivoted in the channel as described above. Either or both could be pivoted in plates at one or both sides of the channel, which plates could be held within the casing in any suitable way.

The channel 11 is held within the casing by one or more projections on the channel which fit into a hole or holes in the casing, and slider 12 is held within the casing by the bridge 50 and the vertical face 40 on the slider at the end of the cam surface 39. Any other suitable means can be provided for holding either the channel or the slider, or both of them, within the casing.

The means for connecting the buckle to a vehicle or aircraft as described above comprises a cable 24. The cable 24 could be rigid or flexible or could be replaced by an extension piece attached to the vehicle directly or via a bracket or other suitable connecting means. When the buckle is used with an adjustable seat the cable, bracket or other fixing means should be such that the buckle is, or can be, moved as the seat is moved so that the safety belt or harness is correctly positioned on the wearer in all positions of the seat. Suitable weak or deformable parts can be provided in the cable, brackets or other fixing means, or in the straps of the safety belt or harness, if desired to absorb part of the stress which occurs when the belt or harness is subjected to severe strain, as might occur in an accident.

Release of the two parts of the buckle described above is controlled by a slider 12, but the invention is not restricted to use in such buckles. The invention can be applied to a buckle in which the releasing element is a press button acting on a lever as 15, or acting directly onto the latch.

One spring 19 mounted on one side of the channel 11 is described above. The spring could be centrally mounted if desired, or more than one spring could be provided, for example springs could be provided on either side of the latch tooth 38.

One contact arm 21 only is shown, the electrical circuit being completed through the metal of the vehicle, but a completely insulated circuit could be used, the contact arm closing or opening contacts in the circuit when it is contacted by the end 34 of spring 19 or by the unit 35.

I claim:

1. A buckle for use with a safety belt or harness on a vehicle comprising: two separable parts adapted to be held together by co-operating aperture and latch means, one part including a plate having at least one aperture to which at least one strap can be fitted, and a second part in which said latch means is mounted and which includes a spring pressed element connected thereto for controlling the latch means to release said latch from said aperture to separate said two separable parts; means for connecting the said second part to the vehicle, the second part having defined therein a mouth into which a portion of the said plate can be placed; and spring means mounted on the second part for ejecting the plate when the latch has been released, the spring means being mounted on the second part and extending from a point within the second part beyond the position of the end of the plate when the plate is locked within the said second part to a location closely adjacent the said mouth, the spring means having one end contacting the plate to act in an essentially continuous manner on the plate as the plate moves from its released position to the said mouth said essentially continuous action of said spring ensuring that said plate will be completely ejected from said second part.

2. A buckle as defined in claim 1 in which additional means is provided on the second part for operating auxiliary equipment for the vehicle when the two parts of the buckle are not connected, said additional means further including contact means thereon for controlling the additional means, the additional means being mounted on the second part adjacent the said mouth so that the contact means is controlled by the end of the spring which acts on the plate.

3. A buckle as defined in claim 1 further including edges on said mouth and projecting means on the plate to close any gaps which exist between the plate and the edges of the mouth.

4. A buckle for use with a safety belt or harness on a vehicle comprising: two separable parts adapted to be held together by co-operating aperture and latch means; one of the parts including a casing having a top, bottom and sides and an entrance slot in one end thereof; means on the other end of the casing for attachment thereof to the vehicle, a slide member slidably mounted in the casing, said slide member having one end portion extended axially outward of said one end of said casing and having a sloping cam surface on a lower surface portion thereof in the casing, first spring means engaged with the slide member urging it outwardly of the casing, a latch pivotally mounted in the casing, said latch including a latching projection on one end thereof, second spring means in the casing engaged with the latch urging the latch into latching position, a plate having at least one aperture therethrough and having means on one end thereof for attachment thereto of at least one safety belt, said plate having a size such as to be capable of insertion into the slot in the casing and into a position with the latching projection of the latch engaged in the aperture of the plate to prevent withdrawal of the plate from the casing, said slide member movable inwardly of the casing against the urging of the first spring means into a position in which it causes the latch to be pivoted out of latching engagement with the plate, third spring means mounted within the casing engageable with the plate as the plate is inserted into the slot in the casing and remaining engaged with the plate all the time the plate remains within the casng to eject the plate from the casing when the latch is pivoted out of latching engagement with the plate, said third spring means having one end located closely adjacent said entrance slot for urging said plate outwardly of said casing in an essentially continuous manner as said plate moves from a released position to said entrance slot to ensure complete ejection of said plate from said casing upon release of said plate.

5. A buckle as defined in claim 4 further including contact means mounted adjacent the slot in the casing, said contact means being controlled by said third spring means to operate auxiliary equipment when the two parts are not connected.

6. A buckle as defined in claim 4 further including a spigot mounted axially within the casing upon which said third spring means expands and is compressed.

7. A buckle for use with a safety belt or harness on a vehicle comprising: two separable parts held together by co-operating aperture and latch means, one of the parts including a casing having a top, bottom and sides and an entrance slot in one end thereof, means on the other end of the casing for attachment thereof to the vehicle, a slide member slidably mounted in the casing, said slide member having one end portion extended axially outward of said one end of said casing and having a sloping cam surface on a lower surface portion thereof in the casing, first spring means engaged with the slide member urging it outwardly of the casing, a latch pivotally mounted in the casing, said latch including a latching projection on one end thereof for insertion into said aperture to lock said two separable parts together, second spring means in the casing engaged with the latch urging the latch into latching position within said aperture, a plate having said aperture defined therethrough and having means on one end therefor for attachment thereto of at least one safety belt, said plate having a forward end and a size such as to be capable of insertion into the slot in the casing and into a position with the latching projection of the latch engaged in the aperture of the plate to prevent withdrawal of the plate from the casing, third spring means mounted along a spigot axially within the casing and adapted to extend from closely adjacent the slot to a pont beyond that reached by the end of the plate when the plate is latched within the casing, said third spring means being mounted to have one end located closely adjacent said casing slot and being compressed along the spigot as the plate is moved from the slot into the latching position and cooperating with said plate to urge said plate outwardly of said casing in an essentially continuous manner until said plate forward end is closely adjacent said casing slot so that complete ejection of said plate is essentially ensured upon release of said latch from said aperture to eject the plate from the casing when the latch is moved out of latching engagement with the plate.

8. A buckle as defined in claim 7 in which the plate has projecting means for closing any gaps between the plate, when latched within the casing, and the underside of the slide member.

9. A buckle as defined in claim 7 further including a crank means attached to the plate.

10. A buckle as defined in claim 7 further including contact means mounted adjacent the slot in the casing and controlled by the third spring means to operate auxiliary equipment when the two parts are not connected.

11. A buckle for use with a safety belt or harness on a vehicle comprising:
a casing having an entrance slot and a latching mechanism and connected to the vehicle;
a plate connected to a safety belt and being adapted to be locked to said casing by said latching mechanism;
switching means mounted in said casing for activating auxiliary equipment on the vehicle, said switching means being controlled by said plate;
latch releasing means on said casing for unlocking said plate from said casing; and
ejecting means in said casing for ejecting an unlocked plate from said casing, said ejecting means including a spring mounted on said casing to be engaged by said plate when said plate is located in said casing, said spring being located closely adjacent said entrance slot so that an outward bias tending to eject said plate from said casing is applied to said plate almost as soon as said plate is inserted through said entrance slot such that an ejecting bias is applied to said plate for essentially the entire time said plate is located in said casing thereby ensuring that said plate will be completely ejected from said casing upon release of said latch to unlock said plate from said casing.

* * * * *